US012665889B2

(12) United States Patent
Xiao et al.

(10) Patent No.: US 12,665,889 B2
(45) Date of Patent: Jun. 23, 2026

(54) DATA TRANSMISSION PROTOCOL EXECUTION METHODS AND APPARATUSES

(71) Applicant: Alipay (Hangzhou) Information Technology Co., Ltd., Hangzhou (CN)

(72) Inventors: Junxian Xiao, Hangzhou (CN); Shuai Wang, Hangzhou (CN); Shoumeng Yan, Hangzhou (CN); Xiaomeng Zhang, Hangzhou (CN); Wenting Chang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 239 days.

(21) Appl. No.: 18/528,360

(22) Filed: Dec. 4, 2023

(65) Prior Publication Data

US 2024/0205204 A1     Jun. 20, 2024

(30) Foreign Application Priority Data

Dec. 16, 2022     (CN) .......................... 202211625495.8

(51) Int. Cl.
*H04L 29/06*      (2006.01)
*H04L 9/06*       (2006.01)
            (Continued)

(52) U.S. Cl.
CPC ........ *H04L 63/0485* (2013.01); *H04L 9/0618* (2013.01); *H04L 9/3247* (2013.01)

(58) Field of Classification Search
CPC . H04L 63/0485; H04L 9/0618; H04L 9/3247; H04L 9/0825; H04L 63/0428;
            (Continued)

(56) References Cited

U.S. PATENT DOCUMENTS

2006/0294367 A1* 12/2006 Yoshioka ............ H04L 63/1466
                                                                713/156
2009/0006844 A1*  1/2009 Wing .................... H04L 63/126
                                                                709/227
            (Continued)

FOREIGN PATENT DOCUMENTS

CN         111740844 A  * 10/2020 ........... H04L 9/3236
CN         109547471 B  * 10/2021 ........... H04L 63/045
            (Continued)

OTHER PUBLICATIONS

King et al., "HTTPA: HTTPS Attestable Protocol," CoRR, submitted on Sep. 26, 2022, arXiv:2110.07954v3, 10 pages.
            (Continued)

*Primary Examiner* — Sher A Khan
(74) *Attorney, Agent, or Firm* — Fish & Richardson P.C.

(57)          ABSTRACT

This specification provide computer-implemented methods, and apparatuses for data transmission protocol execution and data storage. Execution of a data transmission protocol includes an initiator and a receiver. In an example execution process, a first application serving as the initiator encapsulates protocol information related to a transmission handshake protocol, ciphertext data obtained by encrypting target privacy data using an encryption method determined based on the protocol information, signature information obtained by digitally signing the ciphertext data and the protocol information using a private key, field content of an attestation field, and the like into a data transmission unit. The attestation field is used to fill a remote attestation report that includes public key information of the initiator. A second application serving as the receiver decapsulates the data transmission unit, and uses the target privacy data after verifying the signature information and the like in the decapsulated data transmission unit.

17 Claims, 10 Drawing Sheets

(51) Int. Cl.
   *H04L 9/32*          (2006.01)
   *H04L 9/40*          (2022.01)
(58) Field of Classification Search
   CPC ... H04L 63/0442; H04L 63/126; H04L 9/083;
                                           H04L 9/0894
   See application file for complete search history.

(56)                      References Cited

U.S. PATENT DOCUMENTS

| | | | | |
|---|---|---|---|---|
| 2009/0006851 | A1* | 1/2009 | Freeman | H04L 63/126 |
| | | | | 713/170 |
| 2012/0204032 | A1* | 8/2012 | Wilkins | H04L 63/0428 |
| | | | | 713/170 |
| 2021/0203502 | A1* | 7/2021 | Cheung | H04L 9/50 |
| 2022/0052859 | A1* | 2/2022 | Marzorati | H04L 63/0428 |
| 2023/0027422 | A1* | 1/2023 | Hines, III | H04L 9/0852 |

FOREIGN PATENT DOCUMENTS

| | | | | | |
|---|---|---|---|---|---|
| CN | 113904767 | A | * | 1/2022 | H04L 9/3239 |
| CN | 115174267 | A | * | 10/2022 | H04L 63/166 |
| JP | 2020502896 | A | * | 1/2020 | H04L 9/3247 |
| WO | WO-2022029762 | A1 | * | 2/2022 | G06F 21/6245 |

OTHER PUBLICATIONS

Knauth et al., "Integrating Remote Attestation with Transport Layer Security," CoRR, submitted on Jan. 17, 2018, arXiv:1801.05863, 11 pages.

* cited by examiner

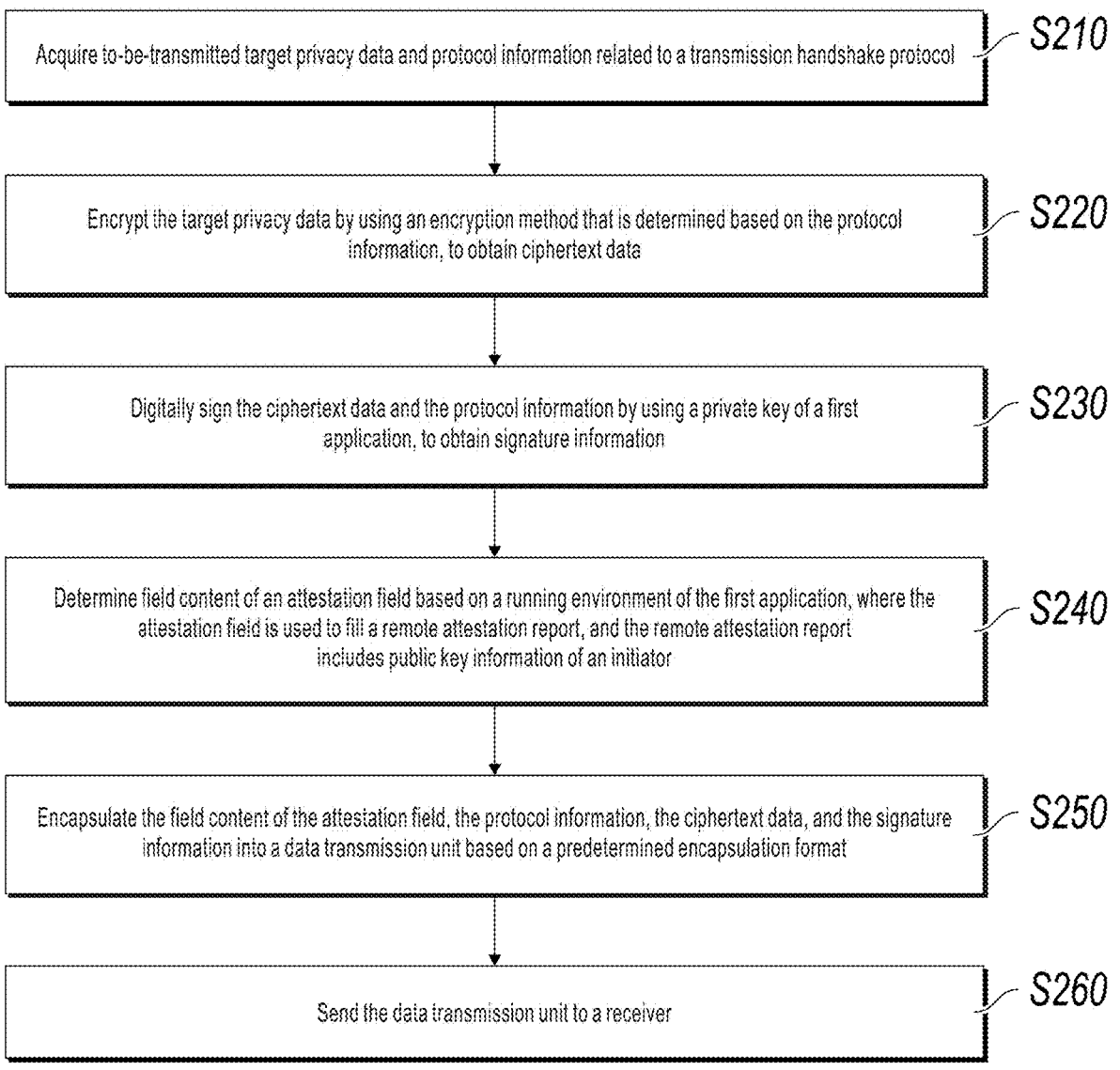

Acquire to-be-transmitted target privacy data and protocol information related to a transmission handshake protocol  — S210

Encrypt the target privacy data by using an encryption method that is determined based on the protocol information, to obtain ciphertext data — S220

Digitally sign the ciphertext data and the protocol information by using a private key of a first application, to obtain signature information — S230

Determine field content of an attestation field based on a running environment of the first application, where the attestation field is used to fill a remote attestation report, and the remote attestation report includes public key information of an initiator — S240

Encapsulate the field content of the attestation field, the protocol information, the ciphertext data, and the signature information into a data transmission unit based on a predetermined encapsulation format — S250

Send the data transmission unit to a receiver — S260

FIG. 2

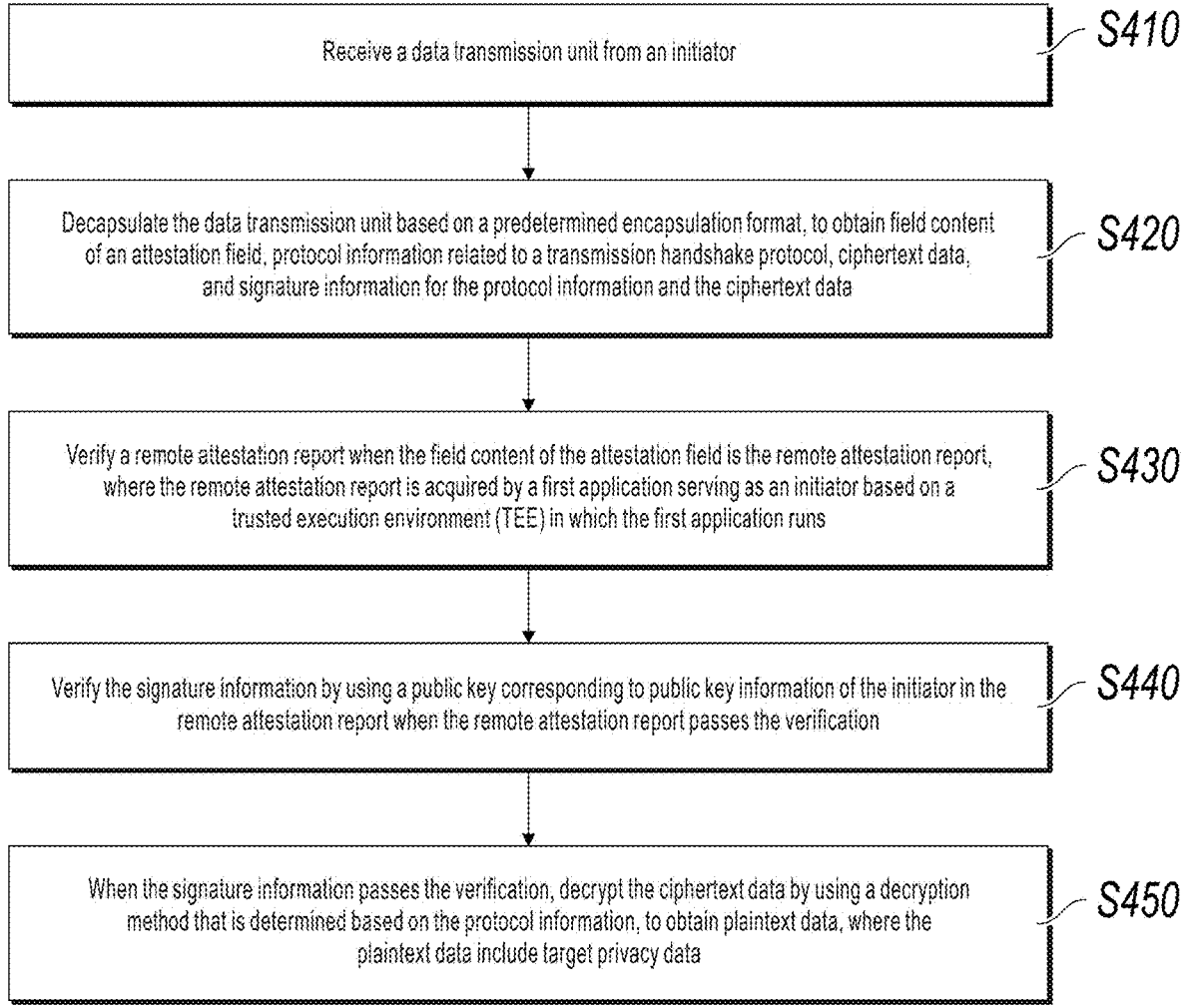

Receive a data transmission unit from an initiator — S410

Decapsulate the data transmission unit based on a predetermined encapsulation format, to obtain field content of an attestation field, protocol information related to a transmission handshake protocol, ciphertext data, and signature information for the protocol information and the ciphertext data — S420

Verify a remote attestation report when the field content of the attestation field is the remote attestation report, where the remote attestation report is acquired by a first application serving as an initiator based on a trusted execution environment (TEE) in which the first application runs — S430

Verify the signature information by using a public key corresponding to public key information of the initiator in the remote attestation report when the remote attestation report passes the verification — S440

When the signature information passes the verification, decrypt the ciphertext data by using a decryption method that is determined based on the protocol information, to obtain plaintext data, where the plaintext data include target privacy data — S450

Acquisition module — 610

Encryption module — 620

Signature module — 630

Authentication module — 640

Encapsulation module — 650

Sending module — 660

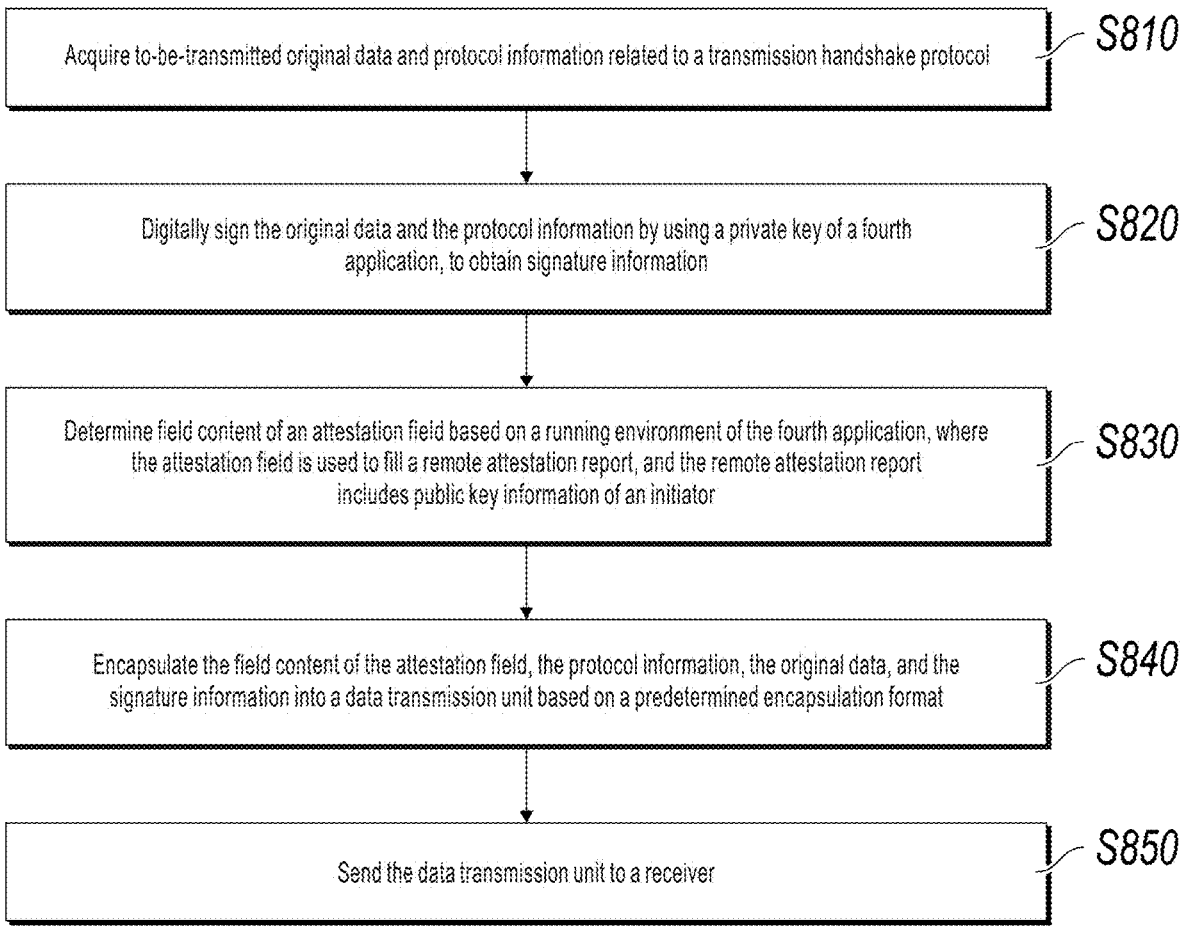

Acquire to-be-transmitted original data and protocol information related to a transmission handshake protocol — S810

Digitally sign the original data and the protocol information by using a private key of a fourth application, to obtain signature information — S820

Determine field content of an attestation field based on a running environment of the fourth application, where the attestation field is used to fill a remote attestation report, and the remote attestation report includes public key information of an initiator — S830

Encapsulate the field content of the attestation field, the protocol information, the original data, and the signature information into a data transmission unit based on a predetermined encapsulation format — S840

Send the data transmission unit to a receiver — S850

FIG. 8

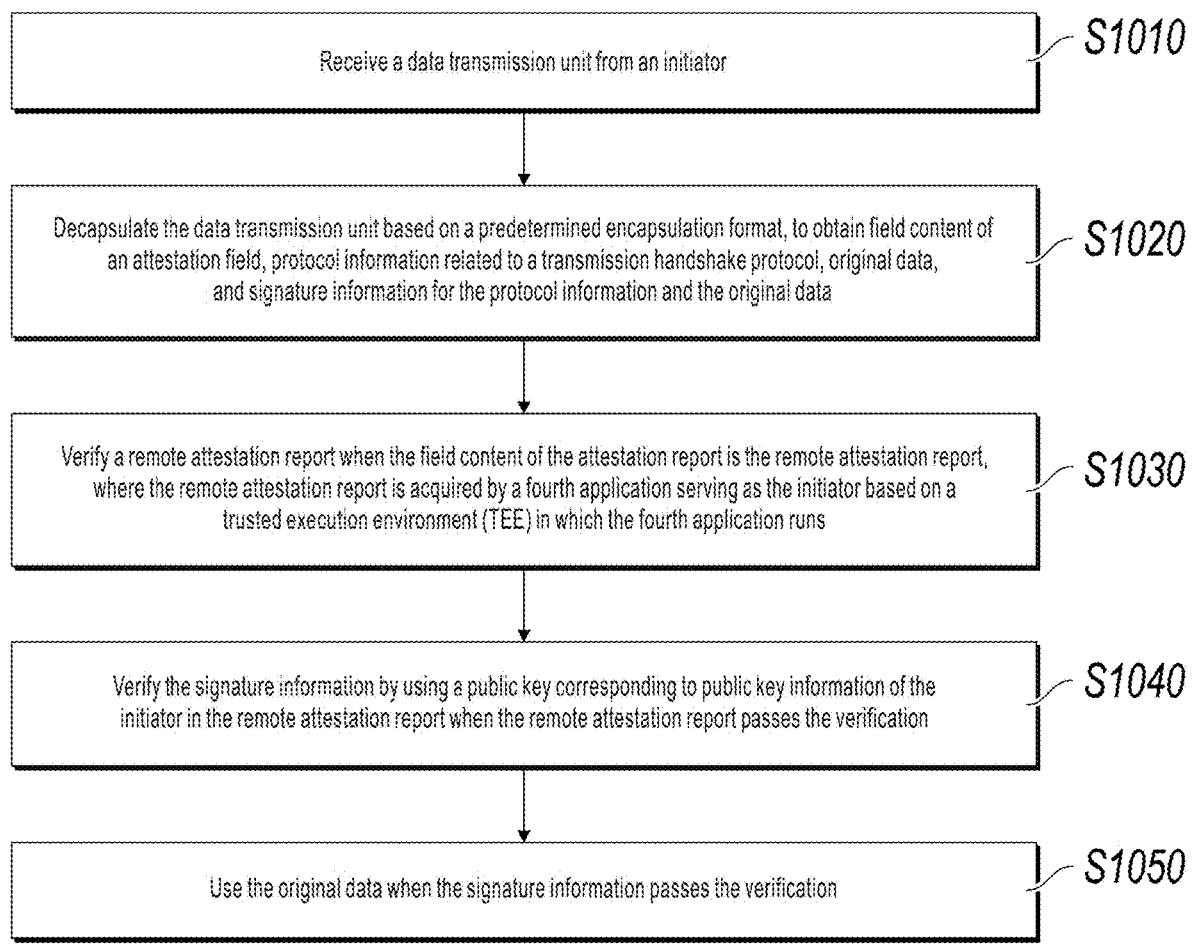

Receive a data transmission unit from an initiator — S1010

Decapsulate the data transmission unit based on a predetermined encapsulation format, to obtain field content of an attestation field, protocol information related to a transmission handshake protocol, original data, and signature information for the protocol information and the original data — S1020

Verify a remote attestation report when the field content of the attestation report is the remote attestation report, where the remote attestation report is acquired by a fourth application serving as the initiator based on a trusted execution environment (TEE) in which the fourth application runs — S1030

Verify the signature information by using a public key corresponding to public key information of the initiator in the remote attestation report when the remote attestation report passes the verification — S1040

Use the original data when the signature information passes the verification — S1050

FIG. 10

DATA TRANSMISSION PROTOCOL EXECUTION METHODS AND APPARATUSES

CROSS-REFERENCE TO RELATED APPLICATIONS

This application claims priority to Chinese Patent Application No. 202211625495.8, filed on Dec. 16, 2022, which is hereby incorporated by reference in its entirety.

TECHNICAL FIELD

One or more embodiments of this specification relate to the field of computer technologies, and in particular, to data transmission protocol execution methods and apparatuses, and data storage methods that are implemented based on data transmission protocols.

BACKGROUND

With the advent of the big data era, how to ensure privacy security of data in processes such as transmission and use has become a current research hotspot.

However, currently, a scenario to which an existing privacy data transmission method is applicable is limited. Therefore, a newly designed data transmission protocol is needed to better satisfy actual applications.

SUMMARY

Some embodiments of this specification describe data transmission protocol execution methods and apparatuses, and data storage methods that are implemented based on data transmission protocols, so as to better satisfy actual applications.

According to a first aspect, a data transmission protocol execution method is provided, where the method is performed by a first application serving as an initiator, and includes: acquiring to-be-transmitted target privacy data and protocol information related to a transmission handshake protocol; encrypting the target privacy data by using an encryption method that is determined based on the protocol information, to obtain ciphertext data; digitally signing the ciphertext data and the protocol information by using a private key of the first application, to obtain signature information; determining field content of an attestation field based on a running environment of the first application, where the attestation field is used to fill a remote attestation report, and the remote attestation report includes public key information of the initiator; and encapsulating the field content of the attestation field, the protocol information, the ciphertext data, and the signature information into a data transmission unit based on a predetermined encapsulation format, and sending the data transmission unit to a receiver.

In some embodiments, the method further includes: acquiring metadata determined for the target privacy data, where the metadata include at least one type of the following data: collection information description type data, data information flow direction type data, usage method restriction type data, security check type data, and compliance check type data; and the encrypting the target privacy data by using an encryption method that is determined based on the protocol information, to obtain ciphertext data includes: encrypting the target privacy data and the metadata by using the encryption method to obtain the ciphertext data.

In some specific embodiments, the security check type data include a hash value of the target privacy data and/or data freshness of the target privacy data.

In some embodiments, the determining field content of an attestation field based on a running environment of the first application includes: when the running environment of the first application is a trusted execution environment (TEE) environment, determining the field content to be a remote attestation report generated by the first application; or when the running environment of the first application is a non-TEE environment, determining the field content to be a predetermined field value indicating that there is no remote attestation report.

In some embodiments, the public key information of the initiator is a public key corresponding to the private key, or the public key information of the initiator is a hash value of a public key corresponding to the private key, and the public key is further encapsulated in the data transmission unit.

In some embodiments, the target privacy data include data used for privacy computation or a result of privacy computation.

According to a second aspect, a data transmission protocol execution method is provided, where the method is performed by a second application serving as a receiver, and includes: receiving a data transmission unit from an initiator, and decapsulating the data transmission unit based on a predetermined encapsulation format, to obtain field content of an attestation field, protocol information related to a transmission handshake protocol, ciphertext data, and signature information for the protocol information and the ciphertext data; verifying a remote attestation report when the field content is the remote attestation report, and verifying the signature information by using a public key corresponding to public key information of the initiator in the remote attestation report when the verification succeeds, where the remote attestation report is acquired by a first application serving as the initiator based on a trusted execution environment (TEE) in which the first application runs; and when the signature information passes the verification, decrypting the ciphertext data by using a decryption method that is determined based on the protocol information, to obtain plaintext data, where the plaintext data include target privacy data.

In some specific embodiments, the method further includes: when the field content indicates that there is no remote attestation report, verifying the signature information by using a pre-obtained valid public key of the initiator.

In some embodiments, the public key information of the initiator includes the public key.

In some embodiments, the public key information of the initiator includes a public key hash value, and the data obtained through decapsulation further include the public key; and the verifying the signature information by using a public key corresponding to public key information of the initiator in the remote attestation report when the verification succeeds includes: calculating a hash value of the public key when the remote attestation report passes the verification; and verifying the signature information by using the public key when the hash value is consistent with the public key hash value.

In some embodiments, the plaintext data further include metadata determined based on the target privacy data, and the metadata include security check type data and/or compliance check type data; and after the plaintext data are obtained, the method further includes: performing security check on the security check type data; and/or performing compliance check on the compliance check type data.

In some specific embodiments, the security check type data include a privacy data hash value; and the performing security check on the security check type data includes: calculating a hash value of the target privacy data; and determining whether the hash value is consistent with the privacy data hash value.

In some specific embodiments, the security check type data include data freshness of the target privacy data; and the performing security check on the security check type data includes: determining whether the data freshness reaches a predetermined freshness standard.

In some specific embodiments, the target privacy data include collected user privacy data; and the performing compliance check on the compliance check type data includes: determining whether the compliance check type data include user authorization information corresponding to the user privacy data.

In some specific embodiments, the metadata further include usage method restriction type data, and the usage method restriction type data indicate a computation method for performing privacy computation on the target privacy data; and the method further includes: when the security check and/or the compliance check succeeds, performing corresponding privacy computation on the target privacy data based on the computation method.

In some embodiments, the plaintext data further include a computation method for performing privacy computation on the target privacy data; and the method further includes: performing corresponding privacy computation on the target privacy data based on the computation method.

In some embodiments, the second application runs in a trusted execution environment (TEE), and the second application loads the received data transmission unit into the TEE environment in which the second application runs, and then performs a subsequent step.

According to a third aspect, a data storage method implemented based on a data transmission protocol is provided, where the method is performed by a third application running in a TEE environment, and includes: acquiring, by the third application serving as an initiator in the data transmission protocol, to-be-transmitted target privacy data and protocol information related to a transmission handshake protocol that is set by the third application; encrypting the target privacy data by using an encryption method that is determined based on the protocol information, to obtain ciphertext data; encapsulating the protocol information and the ciphertext data into a data transmission unit based on a predetermined encapsulation format; and writing the data transmission unit into untrusted storage space.

In some embodiments, the method further includes: reading, by the third application serving as a receiver in the data transmission protocol, the data storage unit from the untrusted storage space; decapsulating the data storage unit based on the predetermined encapsulation format to obtain the protocol information and the ciphertext data; and decrypting the ciphertext data by using a decryption method that is determined based on the protocol information, to obtain the target privacy data.

According to a fourth aspect, a data transmission protocol execution method is provided, where the method is performed by a fourth application serving as an initiator, and includes: acquiring to-be-transmitted original data and protocol information related to a transmission handshake protocol; digitally signing the original data and the protocol information by using a private key of the fourth application, to obtain signature information; determining field content of an attestation field based on a running environment of the fourth application, where the attestation field is used to fill a remote attestation report, and the remote attestation report includes public key information of the initiator; and encapsulating the field content of the attestation field, the protocol information, the original data, and the signature information into a data transmission unit based on a predetermined encapsulation format, and sending the data transmission unit to a receiver.

According to a fifth aspect, a data transmission protocol execution method is provided, where the method is performed by a fifth application serving as a receiver, and includes: receiving a data transmission unit from an initiator, and decapsulating the data transmission unit based on a predetermined encapsulation format, to obtain field content of an attestation field, protocol information related to a transmission handshake protocol, original data, and signature information for the protocol information and the original data; verifying a remote attestation report when the field content is the remote attestation report, and verifying the signature information by using a public key corresponding to public key information of the initiator in the remote attestation report when the verification succeeds, where the remote attestation report is acquired by a fourth application serving as the initiator based on a trusted execution environment (TEE) in which the fourth application runs; and using the original data when the signature information passes the verification.

According to a sixth aspect, a data transmission protocol execution apparatus is provided, where a first application serving as an initiator is deployed in the execution apparatus, and the execution apparatus includes: an acquisition module, configured to acquire to-be-transmitted target privacy data and protocol information related to a transmission handshake protocol; an encryption module, configured to encrypt the target privacy data by using an encryption method that is determined based on the protocol information, to obtain ciphertext data; a signature module, configured to digitally sign the ciphertext data and the protocol information by using a private key of the first application, to obtain signature information; an authentication module, configured to determine field content of an attestation field based on a running environment of the first application, where the attestation field is used to fill a remote attestation report, and the remote attestation report includes public key information of the initiator; an encapsulation module, configured to encapsulate the field content of the attestation field, the protocol information, the ciphertext data, and the signature information into a data transmission unit based on a predetermined encapsulation format; and a sending module, configured to send the data transmission unit to a receiver.

According to a seventh aspect, a data transmission protocol execution apparatus is provided, where a second application serving as a receiver is deployed in the execution apparatus, and the execution apparatus includes: a receiving module, configured to receive a data transmission unit from an initiator; a decapsulation module, configured to decapsulate the data transmission unit based on a predetermined encapsulation format, to obtain field content of an attestation field, protocol information related to a transmission handshake protocol, ciphertext data, and signature information for the protocol information and the ciphertext data; a report verification module, configured to verify a remote attestation report when the field content is the remote attestation report; a signature verification module, configured to verify the signature information by using a public key corresponding to public key information of the initiator in the remote attestation report when the verification succeeds, where the remote attestation report is acquired by a first application serving as the initiator based on a trusted execution environment (TEE) in which the first application runs; and a decryption module, configured to: when the signature information passes the verification, decrypt the ciphertext data by using a decryption method that is determined based on the protocol information, to obtain plaintext data, where the plaintext data include target privacy data.

According to an eighth aspect, a computer-readable storage medium is provided, where the computer-readable storage medium stores a computer program, and when the computer program is executed in a computer, the computer is enabled to perform the method provided in the first aspect, the second aspect, the third aspect, the fourth aspect, or the fifth aspect.

According to a ninth aspect, a computing device is provided, including a memory and a processor, where the memory stores executable code, and the processor executes the executable code to implement the method provided in the first aspect, the second aspect, the third aspect, the fourth aspect, or the fifth aspect.

According to the above-mentioned methods and apparatuses provided in some embodiments of this specification, a newly designed data transmission protocol is implemented, in which a data transmission unit in a newly designed encapsulation format is used as a center without depending on channel interaction such that privacy data transmission can be implemented securely and efficiently, and all application scenarios of the TEE are compatible.

BRIEF DESCRIPTION OF DRAWINGS

To describe the technical solutions in some embodiments of this application more clearly, the following briefly describes the accompanying drawings needed for describing some embodiments. Clearly, the accompanying drawings in the following description are merely some embodiments of this application, and a person of ordinary skill in the art can still derive other drawings from these accompanying drawings without creative efforts.

FIG. 2 is a schematic flowchart 1 illustrating a method performed by an initiator in a data transmission protocol, according to some embodiments of this specification;

FIG. 4 is a schematic flowchart 1 illustrating a method performed by a receiver in a data transmission protocol, according to some embodiments of this specification;

FIG. 8 is a schematic flowchart 2 illustrating a method performed by an initiator in a data transmission protocol, according to some embodiments of this specification;

FIG. 10 is a schematic flowchart 2 illustrating a method performed by a receiver in a data transmission protocol, according to some embodiments of this specification.

DESCRIPTION OF EMBODIMENTS

The solutions provided in this specification are described below with reference to the accompanying drawings.

As described above, how to ensure privacy security of data in processes such as transmission and use has been referred to as a current research hotspot. Currently, related technical means used mainly include secure multi-party computation, federated learning, differential privacy, trusted execution environment (TEE), etc. Each technical means has its own feature and application scenario. The TEE mainly relies on hardware credibility and features higher performance and flexibility. Regardless of whether the TEE is used as an independent privacy computation solution or is used in combination with another technology, the TEE plays its specific role in many data processing and collaboration service scenarios.

Figure 1:
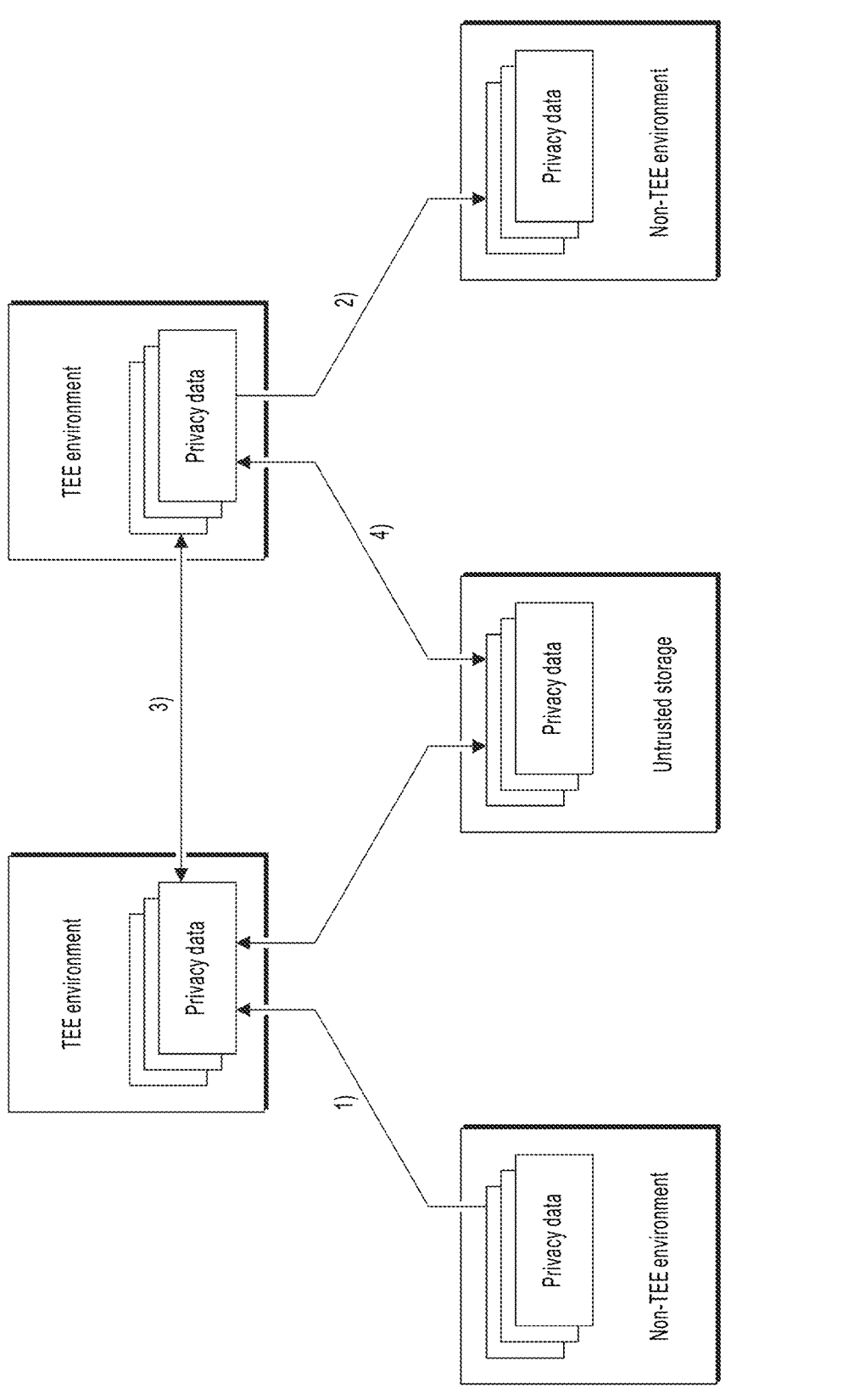
FIG. 1 is a schematic structural diagram illustrating a TEE-based data transmission model, according to some embodiments of this specification.

The essential function of the TEE is to protect code integrity and data confidentiality during running. The data in the TEE can be used in a form of plaintext, but is encrypted for the outside of the TEE. Therefore, the TEE ensures both performance and security. The inventor summarizes a data transmission model related to the TEE in an actual process, as shown in FIG. 1. The data transmission model mainly includes the following four scenarios:

1) Importing data of a non-TEE environment into a TEE environment;

2) Exporting the data of the TEE environment to the non-TEE environment;

3) Data transmission between different TEE environments;

4) Data persistence of the data of the TEE environment in untrusted storage.

Further, the inventor proposes a data transmission protocol, which can be compatible with the above-mentioned four data transmission scenarios.

The following describes the above-mentioned data transmission protocol with reference to some embodiments disclosed in this specification. FIG. 2 is a schematic flowchart 1 illustrating a method performed by an initiator in a data transmission protocol, according to some embodiments of this specification. The initiator can be any application. It should be understood that the application can be a trusted application (TA) running in a TEE environment, or can be an untrusted application running in a non-TEE environment. To distinguish between descriptions, an application serving as an initiator is referred to as a first application below. It is worthwhile to note that the first application here and the second, third, fourth, and fifth applications in the following description are merely intended for ease of description, and have no specific meanings, and do not necessarily indicate different applications. For example, the second application and the third application may be the same application. The method shown in FIG. 2 includes the following steps:

Step S210: Acquire to-be-transmitted target privacy data and protocol information related to a transmission handshake protocol. Step S220: Encrypt the target privacy data by using an encryption method that is determined based on the protocol information, to obtain ciphertext data. Step S230: Digitally sign the ciphertext data and the protocol information by using a private key of the first application, to obtain signature information. Step S240: Determine field content of an attestation field based on a running environment of the first application, where the attestation field is used to fill a remote attestation report, and the remote attestation report includes public key information of the initiator. Step S250: Encapsulate the field content of the attestation field, the protocol information, the ciphertext data, and the signature information into a data transmission unit based on a predetermined encapsulation format. Step S260: Send the data transmission unit to a receiver.

The above-mentioned steps are described in detail as follows:

Step S210: Acquire to-be-transmitted target privacy data and protocol information related to a transmission handshake protocol.

It should be understood that the target privacy data are protected data that really need to be transmitted. Typically, participants in the data transmission protocol are intended to implement privacy computations through data transmission. Therefore, in some embodiments, the target privacy data include data used for privacy computation. In some other embodiments, the original data include a result of privacy computation.

According to some specific embodiments, it is assumed that a privacy computation task is to obtain an intersection of user identifier sets. In such case, in some examples, the target privacy data can be a user identifier set in the first application. In some other examples, the target privacy data can be a calculation result of obtaining, by the first application, an intersection between the user identifier set of the first application and a user identifier set of another application.

The target privacy data have been described above.

It can be understood that the above-mentioned transmission handshake protocol (or briefly referred to as handshake protocol) is responsible for establishing or restoring identity authentication and key exchange needed for secure transmission. Generally, before starting to transmit the protected data, two communication parties need to perform a plurality of rounds of negotiation and interaction by executing the handshake protocol to establish a secure channel. However, in some embodiments of this specification, the handshake protocol does not need to be executed, and interaction and negotiation do not need to be performed in advance, either. Instead, protocol content and related protocol information that are directly set by a single party for the transmission handshake protocol are introduced such that the initiator can perform encryption independently based on the protocol information, and the receiver can perform decryption independently based on the protocol information. It is worthwhile to note that the above-mentioned single party is an application that initiates initial data transmission in a process of performing data transmission with the first application by using the data transmission protocol. The single party may be the first application, or may be another application.

The above-mentioned protocol information indicates an encryption/decryption method. In some embodiments, the protocol information includes a version number of the handshake protocol, a cipher suite, a random number generated by the local party, etc. In some examples, the handshake protocol included in the protocol information is a transport layer security (TLS) protocol, the protocol version number is 1.3, the cipher suite includes a key exchange algorithm RSA, and so on. In some other examples, the protocol information instructs to select a digital envelope as an encryption/decryption method, and includes a key ciphertext that is obtained by encrypting a symmetric key by using a public key of the receiver. The receiver is a receiver of the data transmission protocol, and the symmetric key can be randomly generated by the first application locally.

In some embodiments, the protocol information includes a mapping relationship between a plurality of rounds (generally two rounds) of transmission and a plurality of pieces of encryption/decryption information. It should be understood that each round of transmission is one-way transmission, and two rounds of transmission form one roundtrip. In some specific embodiments, the mapping relationship specifically includes: During the first round of transmission, an encryption key is a public key of the receiver, and a decryption key is a private key of the receiver. During subsequent rounds of transmission, the encryption key and the decryption key are symmetric keys, and are determined based on random numbers respectively generated by the sender and the receiver.

The unilateral setting and related protocol information of the transmission handshake protocol have been described above.

Moreover, in some embodiments of this step, in addition to acquiring the above-mentioned target privacy data and protocol information, the first application can further acquire metadata for the target privacy data. The metadata can be used to check for security, compliance, or the like of the target privacy data, or can help understand background information such as a collection scenario of the target privacy data.

In some specific embodiments, the metadata include collection information description type data, for example, a field description (for example, a field name is a user identifier), collection software, a data volume, or a data scale of the target privacy data.

In some other specific embodiments, the metadata include data information flow direction type data, for example, a source or a producer (for example, company A) of the target privacy data, and an expected consumer (for example, company B) of the target privacy data.

In still some other specific embodiments, the metadata include usage method restriction type data, for example, a computation method for performing privacy computation on the target privacy data, and an upper limit of a data volume to be used for one single time. It can be understood that a form of the usage method restriction type data can be a rule.

In yet some other specific embodiments, the metadata include security check type data, for example, a hash value of the target privacy data, and data freshness (for example, the most recent day and the last week). Such a method can help enhance process security of the data transmission protocol.

In still yet some other specific embodiments, the metadata include compliance check type data, such as relevant user authorization information. It should be understood that the compliance check type data can be set based on relevant regulations.

The target privacy data, the handshake protocol information, and the optional metadata that are acquired by the first application have been described above.

Step S220: Encrypt the target privacy data by using an encryption method that is determined based on the protocol information, to obtain ciphertext data.

In some embodiments, an encryption key is determined based on the protocol information such that encryption processing is performed on the target privacy data by using the encryption key to obtain ciphertext data. In some specific embodiments, the symmetric key randomly generated by the first application locally is used as the encryption key based on the protocol information. In some other specific embodiments, the public key of the receiver is used as the encryption key based on the protocol information.

In some other embodiments, the encryption method determined based on the protocol information includes switching a plurality of designated bits in a predetermined sequence. As such, the ciphertext data can be obtained by switching created bits in the target privacy data in a predetermined sequence.

Moreover, in some embodiments, when the data acquired above include metadata, implementation of this step can include: encrypting the target privacy data and the metadata by using the encryption method that is determined based on the protocol information, to obtain the ciphertext data.

In some specific embodiments, the target privacy data and the metadata can be concatenated first, and then a concatenation result is encrypted. In some other specific embodiments, the target privacy data and the metadata can be separately encrypted, and then two encryption results are classified into ciphertext data.

As such, the ciphertext data can be obtained. Based on the above-mentioned description, perform step S230: Digitally sign the ciphertext data and the protocol information by using a private key of the first application, to obtain signature information.

In some embodiments, first, the ciphertext data and the protocol information are concatenated and a hash value of a concatenation result is calculated, and then the hash value is encrypted by using a private key such that an encryption result is used as signature information. It can be understood that the digital signature can be further implemented using another method. For example, hash values of the ciphertext data and the protocol information are separately calculated, and the two calculated hash values are further hashed. Then, a result of the further hashing is encrypted by using the private key of the first application, and an encryption result is used as the above-mentioned signature information.

As such, the signature information can be obtained.

Step S240: Determine field content of an attestation field based on a running environment of the first application.

It is worthwhile to note that a relative execution sequence between this step and the above-mentioned steps S210, S220, and S230 is not limited in some embodiments of this specification. For example, step S210 can be performed before step S240. For another example, step S230 and step S240 can be performed simultaneously.

The above-mentioned attestation field is used to fill the remote attestation report. Remote attestation is a very important specific security function in the TEE environment. The remote attestation can be used to verify that the expected TA application runs in the expected TEE environment. It should be understood that the remote attestation report is available only for the TA application running in the TEE environment.

Based on the above-mentioned description, implementation of this step can include: when the running environment of the first application is a TEE environment, determining field content of an attestation field as a remote attestation report generated by the first application. It can be understood that the remote attestation report generally includes a metric of program code running in the TEE, such as a hash value of the code.

It is worthwhile to note that in some embodiments disclosed in this specification, a purpose of acquiring the remote attestation report of the first application running in the TEE environment is to endorse a public key of the initiator such that the receiver does not need to additionally acquire the public key of the initiator. In terms of an implementation means, the remote attestation report disclosed in some embodiments of this specification is set to include the public key information of the initiator. Typically, the remote attestation report includes a user-defined field, and the public key information of the initiator can be filled in the user-defined field.

In some embodiments, the public key information of the initiator is a public key corresponding to the private key of the first application. In some other embodiments, considering that a length of the user-defined field in the remote attestation report is limited, and a quantity of bytes of the public key is usually large, it is proposed to calculate a hash value of the public key as the public key information of the initiator, and fill the hash value in the user-defined field.

The implementation of this step can further include: when the running environment of the first application is a non-TEE environment, such as a rich execution environment (REE), determining the field content of the attestation field to be a predetermined field value (such as 0) indicating that there is no attestation report.

As such, the field content of the attestation field can be determined.

After the protocol information, the ciphertext data, the signature information, and the field content of the attestation field are obtained, perform step S250: Encapsulate the protocol information, the ciphertext data, the signature information, and the field content of the attestation field into a data transmission unit based on a predetermined encapsulation format.

Figure 3:
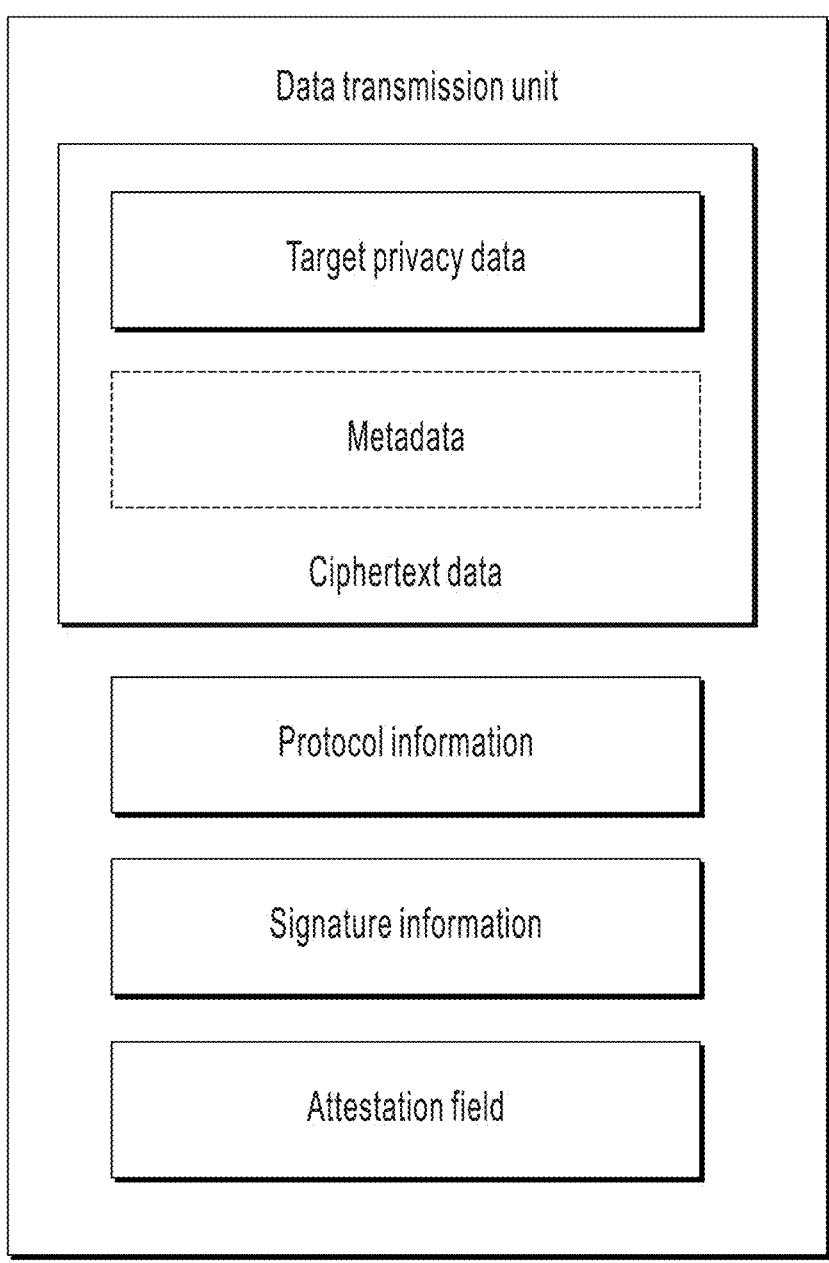
FIG. 3 is a schematic diagram 1 illustrating composition content of a data transmission unit, according to some embodiments of this specification.

It should be understood that the encapsulation format can include an arrangement sequence of different fields, a constraint on a length of each field, a method for splitting field content that exceeds the field length, etc. There can be one or more encapsulated data transmission units. Specifically, if none of lengths of the fields exceeds a corresponding length limit, the fields can be encapsulated into one data transmission unit. If a length of a specific field exceeds a corresponding length limit, the fields can be encapsulated into a plurality of data transmission units through splitting. In some examples, the predetermined encapsulation format includes arranging fields in the following sequence: a ciphertext data field, a protocol information field, a signature information field, and an attestation field. Therefore, for the encapsulated data transmission unit, references can be made to FIG. 3.

It is worthwhile to note that, for an execution environment of the above-mentioned steps S210, S220, S230, S240, and S250, if the first application is a trusted application, the above-mentioned steps need to be performed in the TEE environment in which the first application runs, and the private key of the first application is also stored in the TEE environment. If the first application is not a trusted application, the above-mentioned steps can be performed in a non-TEE environment.

After the data encapsulation unit is obtained, perform step S260: Send the data transmission unit to a receiver.

In conclusion, according to the method, disclosed in some embodiments of this specification, in which the initiator executes the data transmission protocol, the transmission handshake protocol information is expanded in the encapsulated data transmission unit to determine data transmission handshake and encryption/decryption methods, and the TEE-specific remote attestation report and procedure are introduced to ensure security of the data transmission protocol such that the data transmission unit can be self-propagated without using another transmission protocol.

The method for using the data transmission protocol for network transmission has been described above from the perspective of the initiator. The method for using the data transmission protocol for network transmission is described below from the perspective of the receiver. FIG. 4 is a schematic flowchart 1 illustrating a method performed by a receiver in a data transmission protocol, according to some embodiments of this specification. The receiver can be any application. The application can be a TA application running in a TEE environment, or can be a non-TA application. To distinguish between descriptions, an application serving as a receiver is referred to as a second application below. The method shown in FIG. 4 includes the following steps:

Step S410: Receive a data transmission unit from an initiator. Step S420: Decapsulate the data transmission unit based on a predetermined encapsulation format, to obtain field content of an attestation field, protocol information related to a transmission handshake protocol, ciphertext data, and signature information for the protocol information and the ciphertext data. Step S430: Verify a remote attestation report when the field content of the attestation field is the remote attestation report, where the remote attestation report is acquired by a first application serving as the initiator based on a trusted execution environment (TEE) in which the first application runs. Step S440: Verify the signature information by using a public key corresponding to public key information of the initiator in the remote attestation report when the remote attestation report passes the verification. Step S450: When the signature information passes the verification, decrypt the ciphertext data by using a decryption method that is determined based on the protocol information, to obtain plaintext data, where the plaintext data include target privacy data.

The above-mentioned steps are described in detail as follows:

First, perform step S410: Receive a data transmission unit from an initiator. It should be understood that the initiator is the initiator of the data transmission protocol, for example, can be the above-mentioned first application. In addition, there can be one or more data transmission units received in one batch.

Next, perform step S420: Decapsulate the data transmission unit based on a predetermined encapsulation format, to obtain field content of an attestation field, protocol information related to a transmission handshake protocol, ciphertext data, and signature information for the protocol information and the ciphertext data. For example, each field can be extracted from the data transmission unit based on the predetermined encapsulation format.

Then, perform S430: Verify a remote attestation report when the field content of the attestation field is the remote attestation report, where the remote attestation report is acquired by a first application serving as the initiator based on a TEE environment in which the first application runs.

In some embodiments, the second application can independently verify validity of the remote attestation report locally. In some other embodiments, the second application can interact with a remote authentication server to verify the validity of the remote attestation report. It should be understood that the verification of the remote attestation report includes verifying another part except the public key information of the initiator, such as a metric value of code information. When the another part passes the verification, the public key information of the initiator passes the verification accordingly.

Further, when the remote attestation report passes the verification, step S440 is performed; otherwise, the current procedure is terminated.

Step S440: Verify the signature information by using a public key corresponding to public key information of the initiator in the remote attestation report.

In some embodiments, the public key information of the initiator includes a public key of the initiator. In such case, the public key can be directly used to verify the above-mentioned signature information.

In some other embodiments, the public key information of the initiator includes a public key hash value, and the data obtained by decapsulating the data transmission unit further include a public key. Therefore, this step can include: calculating a hash value of the public key obtained through decapsulation, and verifying the signature information by using the public key when the hash value is consistent with the public key hash value included in the public key information of the initiator.

It can be understood that, for the verification of the signature information by using the public key, a verification method is appropriate to a signature method. In some examples, first, hash values of the ciphertext data and the protocol information are calculated, and signature data are decrypted using the public key. Then, the calculated hash values are compared with a decryption result. If the calculated hash values are consistent with the decryption result, it is determined that the verification of the signature information succeeds; otherwise, it is determined that the verification fails.

It is worthwhile to note that, when the field content of the attestation field is a field value indicating that there is no remote attestation report, the signature information can be verified by using a pre-obtained valid public key of the initiator. There are a plurality of methods for acquiring the valid public key. In some embodiments, the public key registered by the initiator can be downloaded from a public key service system. In some other embodiments, a certificate bound to the initiator can be acquired from a certificate authority (CA), and the certificate includes the public key of the initiator. For some implementations in which the signature information is verified using the public key, references can be made to related descriptions in some embodiments described above, and details are omitted for simplicity.

Further, when the above-mentioned verification of the signature information succeeds, step S450 is performed; otherwise, the current procedure is terminated.

Step S450: Decrypt the ciphertext data by using a decryption method that is determined based on the protocol information, to obtain plaintext data, where the plaintext data include target privacy data.

In some embodiments, the second application determines the decryption key as its private key based on the protocol information. Therefore, the second application can decrypt the ciphertext data by using the private key of the second application to obtain the plaintext data. In some other embodiments, the second application decrypts a key ciphertext in the protocol information by using the private key of the second application, to obtain a symmetric key. Therefore, the second application can decrypt the ciphertext data by using the symmetric key to obtain the plaintext data.

Further, after the plaintext data are obtained above through decryption, the target privacy data included in the plaintext data can be used.

In some implementation situations, the plaintext data further include metadata determined based on the target privacy data. In such case, security check type data or compliance check type data included in the metadata need to be checked, and after the check succeeds, the target privacy data can be used. Otherwise, if the check fails, the current procedure is terminated. It is worthwhile to note that related code of the check can be deployed in the TEE environment, and therefore, forcible check can be implemented since the code cannot be tampered with.

In some embodiments, the metadata include the security check type data, and in such case, the metadata check includes security check. In some specific embodiments, the security check type data include a privacy data hash value. Correspondingly, the security check can include: calculating a hash value of the target privacy data, and determining whether the hash value is consistent with the privacy data hash value. If the hash value is consistent with the privacy data hash value, it indicates that the target privacy data included in the plaintext data are not tampered with, and the check succeeds; or if the hash value is inconsistent with the privacy data hash value, the check fails.

In some other specific embodiments, the security check type data include data freshness of the target privacy data. Correspondingly, the security check can include: determining whether the data freshness reaches a predetermined freshness standard. For example, the predetermined freshness standard includes that a data collection time is in the last week. Assuming that the data freshness of the metadata is the most recent day, it is determined that the data freshness reaches the predetermined freshness standard; otherwise, it is determined that the data freshness does not reach the predetermined freshness standard, and the current procedure is terminated.

In some other embodiments, the metadata include the compliance check type data, and in such case, the metadata check includes compliance check. In some specific embodiments, the target privacy data include collected user privacy data. Correspondingly, the compliance check includes: determining whether the compliance check type data include user authorization information corresponding to the user privacy data.

In still some other embodiments, the metadata further include collection information description type data and/or data information flow direction type data. For descriptions of the two types of metadata, references can be made to descriptions in some embodiments described above, and details are omitted for simplicity.

After the metadata pass the above-mentioned check, the target privacy data can be used. In some embodiments, the metadata further include usage method restriction type data, which indicate a method for using the target privacy data, such as a usage environment and a privacy computation method. Therefore, the target privacy data can be used based on the usage method.

In some other implementation situations, the plaintext data do not include metadata. In such case, the target privacy data can be directly used. In some embodiments, the target privacy data include a result of privacy computation, and a corresponding usage method can be reading or the like. In some other embodiments, the target privacy data include data used for privacy computation. Therefore, the second application can further perform privacy computation based on the target privacy data. In some more specific embodiments, the plaintext data further include a computation method for performing privacy computation on the target privacy data. Correspondingly, corresponding privacy computation can be performed on the target privacy data based on the computation method.

It is worthwhile to note that if the second application is a trusted application running in the TEE environment, after receiving the data transmission unit in step S410, the second application can load the data transmission unit into the TEE environment, and then perform subsequent steps S420, S430, S440, and S450. If the second application is not a trusted application, each step can be performed in the non-TEE environment.

In conclusion, according to the method, disclosed in some embodiments of this specification, in which the receiver executes the data transmission protocol, the data transmission unit is decapsulated based on the predetermined encapsulation format to obtain the attestation field, the protocol information, the ciphertext data, and the signature information for the protocol information and the ciphertext data. Further, the signature information is verified based on the public key that is endorsed by the remote attestation report filled in the attestation field, so as to verify security of the data transmission. When the verification of the signature information succeeds, the ciphertext data are self-decrypted by using a decryption method that is determined based on the protocol information. As such, secure and efficient data transmission can be implemented.

Figure 5:
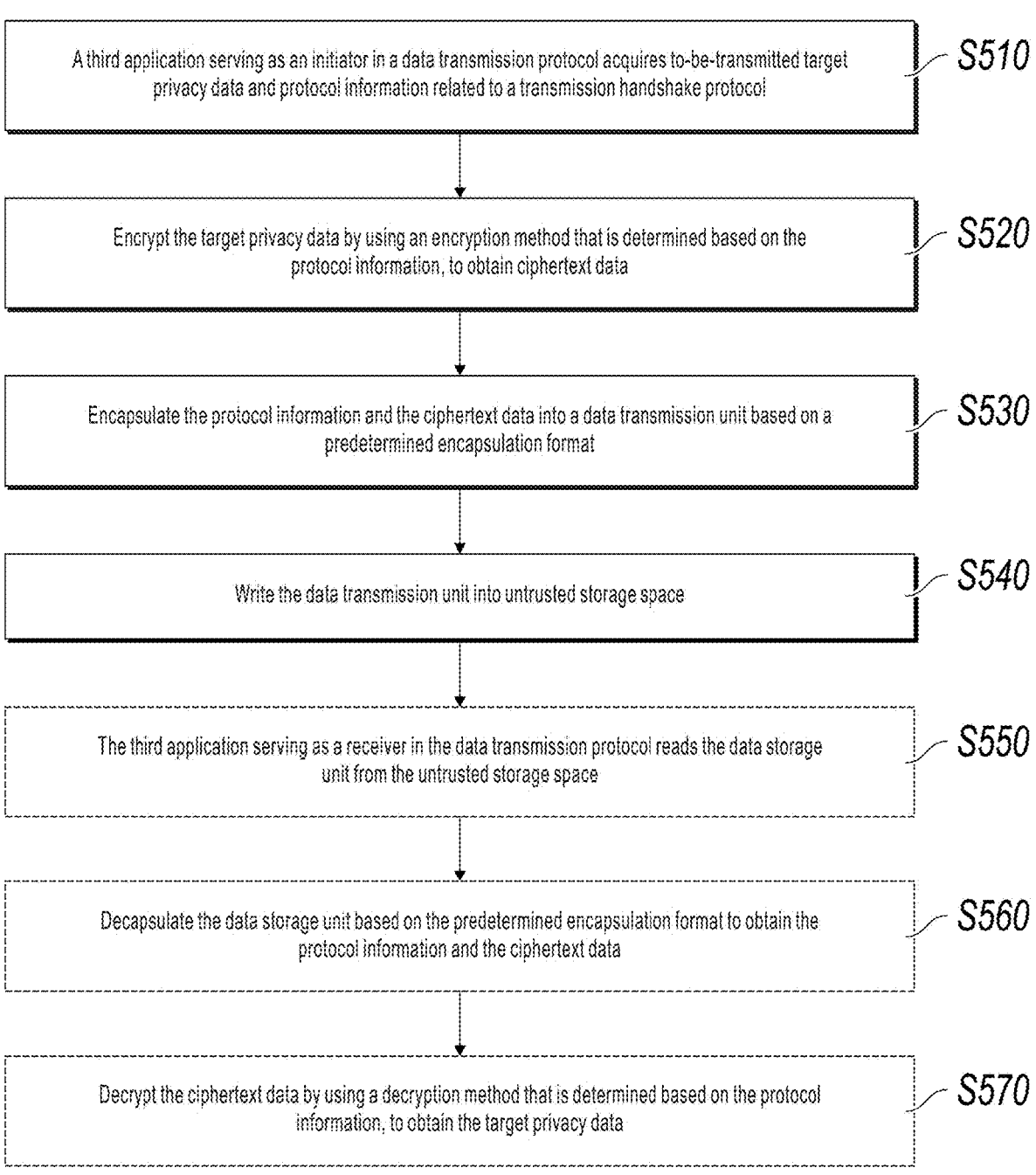
FIG. 5 is a schematic flowchart illustrating a data storage method based on a data transmission protocol, according to some embodiments of this specification.

The method for using the data transmission protocol for network transmission has been separately described above from the perspectives of the initiator and the receiver, which can cover the first three scenarios of the four scenarios shown in FIG. 1. The following describes a method for using the data transmission protocol for data storage, i.e., a scenario 4) shown in FIG. 1. FIG. 5 is a schematic flowchart illustrating a data storage method based on a data transmission protocol, according to some embodiments of this specification. The method is performed by a third application running in the TEE environment. As shown in FIG. 5, the method includes the following steps:

Step S510: The third application serving as an initiator in the data transmission protocol acquires to-be-transmitted target privacy data and protocol information related to a transmission handshake protocol. Step S520: Encrypt the target privacy data by using an encryption method that is determined based on the protocol information, to obtain ciphertext data. Step S530: Encapsulate the protocol information and the ciphertext data into a data transmission unit based on a predetermined encapsulation format. Step S540: Write the data transmission unit into untrusted storage space.

The above-mentioned steps are described in detail as follows:

For the above-mentioned step S510, the transmission handshake protocol and the protocol information can be independently set by the third application.

It is worthwhile to note that for descriptions of step S510 and step S520, references can be further made to the above-mentioned descriptions of step S210 and step S220.

For step S530, in some implementations, the protocol information, the ciphertext data, and the signature information field and the attestation field with default values are encapsulated into a data transmission unit based on the predetermined encapsulation format.

In some other implementations, before step S530 is performed, the method further includes: digitally signing the ciphertext data and the protocol information by using a private key of the third application to obtain signature information; and determining field content of an attestation field based on a running environment of the third application, where the attestation field is used to fill a remote attestation report, and the remote attestation report includes public key information of the initiator. In such case, step S530 can be implemented as: encapsulating the field content of the attestation field, the protocol information, the ciphertext data, and the signature information into a data transmission unit based on a predetermined encapsulation format.

It is worthwhile to note that for related descriptions, references can be made to the above-mentioned descriptions of steps S230, S240, and S250, and details are omitted for simplicity.

Then, in step S540, the third application writes the data transmission unit into untrusted storage space. For example, the data transmission unit is written into the untrusted storage by using a file system write interface or another data source write interface.

As such, the data transmission unit can be written into the untrusted storage space.

In some embodiments, after step S540, the method can further include:

Step S550: The third application serving as a receiver in the data transmission protocol reads the data storage unit from the untrusted storage space.

For example, the data transmission unit is loaded from the untrusted storage into the trusted application by using a file system read interface or another data source read interface.

Step S560: Decapsulate the data storage unit based on the predetermined encapsulation format to obtain the protocol information and the ciphertext data. Step S570: Decrypt the ciphertext data by using a decryption method that is determined based on the protocol information, to obtain the target privacy data.

In some implementations, the signature information and the attestation field that are obtained through decapsulation in step S560 are both default values, which can be ignored, and step S570 can be directly performed.

In some other implementations, after step S560 is performed, and before step S570 is performed, the method further includes: verifying a remote attestation report when the field content of the attestation field obtained through decapsulation is the remote attestation report, where the remote attestation report is acquired by a third application serving as the initiator based on a TEE environment in which the third application runs; and verifying the signature information obtained through decapsulation by using a public key corresponding to public key information of the initiator in the remote attestation report when the remote attestation report passes the verification. Further, step S570 can be implemented as follows: when the signature information passes the verification, decrypt the ciphertext data by using a decryption method that is determined based on the protocol information, to obtain plaintext data.

It is worthwhile to note that for related descriptions, references can be made to the above-mentioned descriptions of steps S430, S440, and S450, and details are omitted for simplicity.

As such, data storage can be implemented using the data transmission protocol.

In conclusion, according to the data transmission protocol disclosed in some embodiments of this specification, a data encapsulation format that can cover all types of TEE scenarios is provided. A TEE efficient data transmission procedure that uses a data transmission unit as a center and does not depend on channel interaction and channel security is provided. Therefore, all TEE application scenarios are compatible, a type and a possible purpose of metadata in the TEE data encapsulation are extended, and support for practical service scenarios of the TEE data encapsulation, for example, privacy compliance check, data traceability, data classification, and governance, is extended.

Figure 6:
FIG. 6 is a schematic structural diagram illustrating a data transmission protocol execution apparatus, according to some embodiments of this specification.

Corresponding to the above-mentioned execution method, some embodiments of this specification further disclose an execution apparatus. FIG. 6 is a schematic structural diagram illustrating a data transmission protocol execution apparatus, according to some embodiments of this specification. A first application serving as an initiator is deployed in the execution apparatus. As shown in FIG. 6, the apparatus 600 includes: an acquisition module 610, configured to acquire to-be-transmitted target privacy data and protocol information related to a transmission handshake protocol; an encryption module 620, configured to encrypt the target privacy data by using an encryption method that is determined based on the protocol information, to obtain ciphertext data; a signature module 630, configured to digitally sign the ciphertext data and the protocol information by using a private key of the first application, to obtain signature information; an authentication module 640, configured to determine field content of an attestation field based on a running environment of the first application, where the attestation field is used to fill a remote attestation report, and the remote attestation report includes public key information of the initiator; an encapsulation module 650, configured to encapsulate the field content of the attestation field, the protocol information, the ciphertext data, and the signature information into a data transmission unit based on a predetermined encapsulation format; and a sending module 660, configured to send the data transmission unit to a receiver.

In some embodiments, the acquisition module 610 is further configured to acquire metadata determined for the target privacy data, where the metadata include at least one type of the following data: collection information description type data, data information flow direction type data, usage method restriction type data, security check type data, and compliance check type data. The encryption module 620 is specifically configured to encrypt the target privacy data and the metadata by using the encryption method to obtain the ciphertext data.

In some specific embodiments, the security check type data include a hash value of the target privacy data and/or data freshness of the target privacy data.

In some embodiments, the authentication module 640 is specifically configured to: when the running environment of the first application is a TEE environment, determine the field content to be a remote attestation report generated by the first application; or when the running environment of the first application is a non-TEE environment, determine the field content to be a predetermined field value indicating that there is no remote attestation report.

In some embodiments, the public key information of the initiator is a public key corresponding to the private key, or the public key information of the initiator is a hash value of a public key corresponding to the private key, and the public key is further encapsulated in the data transmission unit.

In some embodiments, the target privacy data include data used for privacy computation or a result of privacy computation.

Figure 7:
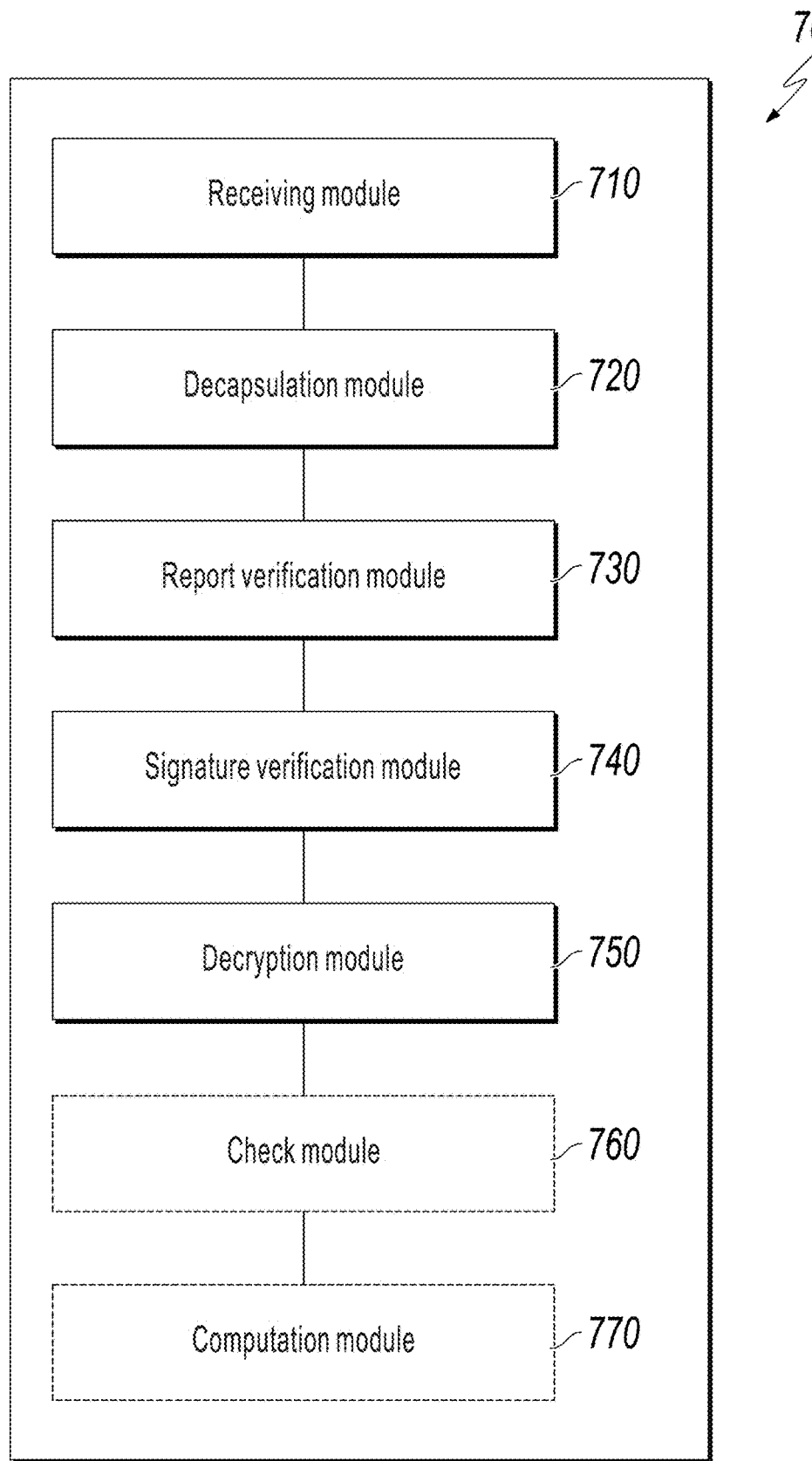
FIG. 7 is a schematic structural diagram illustrating another data transmission protocol execution apparatus, according to some embodiments of this specification.

FIG. 7 is a schematic structural diagram illustrating another data transmission protocol execution apparatus, according to some embodiments of this specification. A second application serving as a receiver is deployed in the execution apparatus. As shown in FIG. 7, the apparatus 700 includes: a receiving module 710, configured to receive a data transmission unit from an initiator; a decapsulation module 720, configured to decapsulate the data transmission unit based on a predetermined encapsulation format, to obtain field content of an attestation field, protocol information related to a transmission handshake protocol, ciphertext data, and signature information for the protocol information and the ciphertext data; a report verification module 730, configured to verify a remote attestation report when the field content is the remote attestation report; a signature verification module 740, configured to verify the signature information by using a public key corresponding to public key information of the initiator in the remote attestation report when the verification succeeds, where the remote attestation report is acquired by a first application serving as the initiator based on a trusted execution environment (TEE) in which the first application runs; and a decryption module 750, configured to: when the signature information passes the verification, decrypt the ciphertext data by using a decryption method that is determined based on the protocol information, to obtain plaintext data, where the plaintext data include target privacy data.

In some embodiments, the signature verification module 740 is further configured to: when the field content indicates that there is no remote attestation report, verify the signature information by using a pre-obtained valid public key of the initiator.

In some embodiments, the public key information of the initiator includes the public key.

In some embodiments, the public key information of the initiator includes a public key hash value, and the data obtained through decapsulation further include the public key; and the signature verification module 740 is specifically configured to: calculate a hash value of the public key when the remote attestation report passes the verification; and verify the signature information by using the public key when the hash value is consistent with the public key hash value.

In some embodiments, the plaintext data further include metadata determined based on the target privacy data, and the metadata include security check type data and/or compliance check type data; and the apparatus further includes a check module 760, configured to perform security check on the security check type data; and/or perform compliance check on the compliance check type data.

In some specific embodiments, the security check type data include a privacy data hash value; and the check module 760 is specifically configured to calculate a hash value of the target privacy data; and determine whether the hash value is consistent with the privacy data hash value.

In some specific embodiments, the security check type data include data freshness of the target privacy data; and the check module 760 is specifically configured to determine whether the data freshness reaches a predetermined freshness standard.

In some specific embodiments, the target privacy data include collected user privacy data; and the check module 760 is specifically configured to determine whether the compliance check type data include user authorization information corresponding to the user privacy data.

In some specific embodiments, the metadata further include usage method restriction type data, and the usage method restriction type data indicate a computation method for performing privacy computation on the target privacy data; and the apparatus 700 further includes a computation module 770, configured to: when the security check and/or the compliance check succeeds, perform corresponding privacy computation on the target privacy data based on the computation method.

In some embodiments, the plaintext data further include a computation method for performing privacy computation on the target privacy data; and the apparatus 700 further includes a computation module 770, configured to perform corresponding privacy computation on the target privacy data based on the computation method.

It is worthwhile to note that, as described above, the ciphertext data are encapsulated into the data transmission unit included in the data transmission protocol. In fact, the plaintext data can also be encapsulated. For example, some non-sensitive data or null data can be transmitted directly in a form of plaintext without encryption. Therefore, some embodiments of this specification further disclose another data transmission protocol execution method.

FIG. 8 is a schematic flowchart 2 illustrating a method performed by an initiator in a data transmission protocol, according to some embodiments of this specification. The method is performed by a fourth application serving as an initiator, and includes:

Step S810: Acquire to-be-transmitted original data and protocol information related to a transmission handshake protocol.

In some embodiments, the original data are non-sensitive data. In some other embodiments, the original data are null.

Step S820: Digitally sign the original data and the protocol information by using a private key of the fourth application, to obtain signature information.

Step S830: Determine field content of an attestation field based on a running environment of the fourth application, where the attestation field is used to fill a remote attestation report, and the remote attestation report includes public key information of the initiator.

Figure 9:
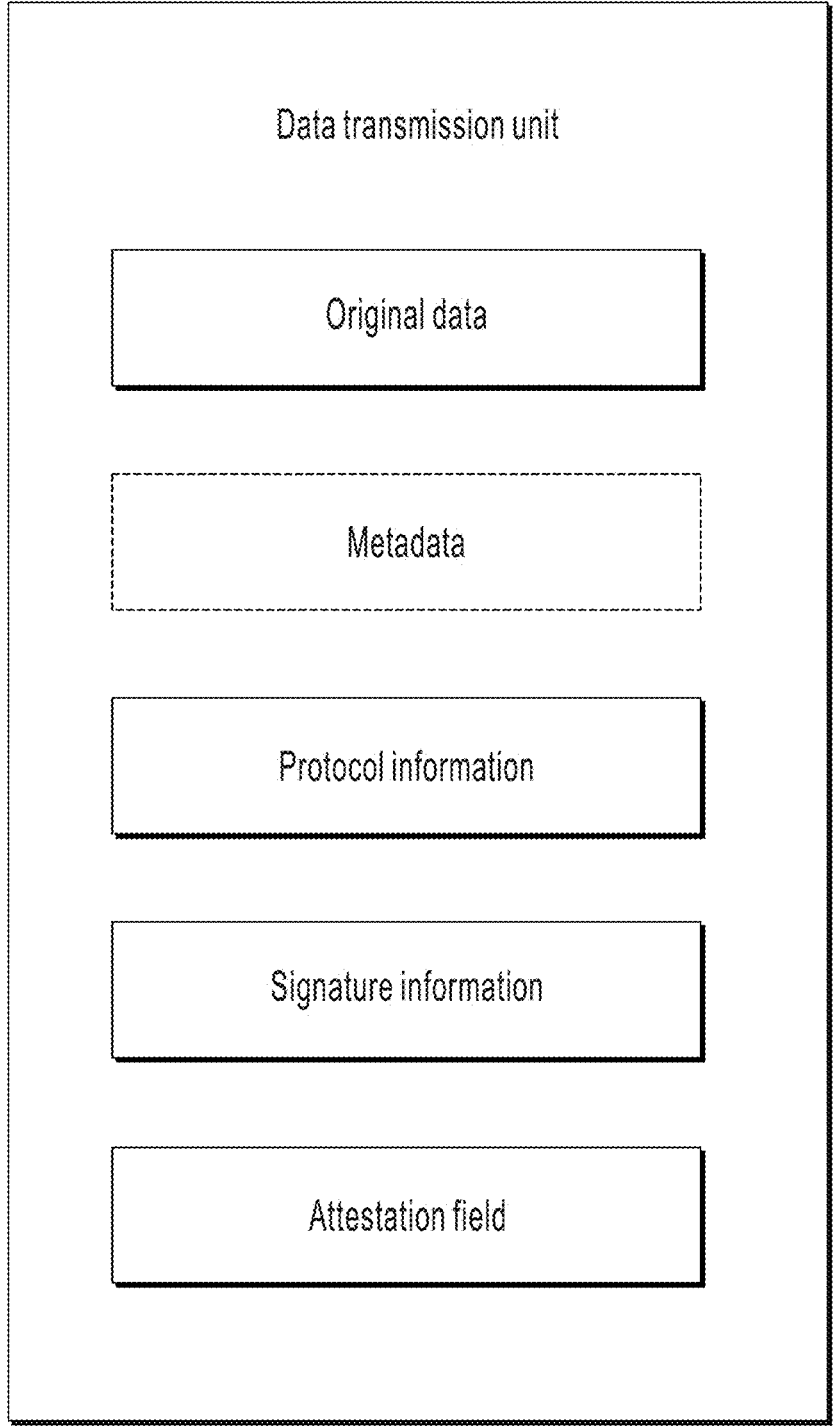
FIG. 9 is a schematic diagram 2 illustrating composition content of a data transmission unit, according to some embodiments of this specification.

Step S840: Encapsulate the field content of the attestation field, the protocol information, the original data, and the signature information into a data transmission unit based on a predetermined encapsulation format. For example, for composition content of the data transmission unit, references can be made to FIG. 9.

Step S850: Send the data transmission unit to a receiver.

It is worthwhile to note that for description of each step in FIG. 8, references can be further made to the above-mentioned related descriptions of the method steps in FIG. 4, and details are omitted for simplicity.

FIG. 10 is a schematic flowchart 2 illustrating a method performed by a receiver in a data transmission protocol, according to some embodiments of this specification. The method is performed by a fifth application serving as a receiver. As shown in FIG. 10, the method includes the following steps:

Step S1010: Receive a data transmission unit from an initiator.

Step S1020: Decapsulate the data transmission unit based on a predetermined encapsulation format, to obtain field content of an attestation field, protocol information related to a transmission handshake protocol, original data, and signature information for the protocol information and the original data.

Step S1030: Verify a remote attestation report when the field content of the attestation report is the remote attestation report, where the remote attestation report is acquired by a fourth application serving as the initiator based on a trusted execution environment (TEE) in which the fourth application runs.

Step S1040: When the remote attestation report passes the verification, verify the signature information by using a public key corresponding to public key information of the initiator in the remote attestation report.

Step S1050: Use the original data when the signature information passes the verification.

In some embodiments, when the signature information passes the verification, the fifth application can determine an encryption key based on the protocol information, and the encryption key is used to encrypt sensitive data subsequently transmitted to the fourth application.

It is worthwhile to note that for descriptions of the steps in FIG. 10, references can be further made to related descriptions in FIG. 5.

According to some embodiments in another aspect, a computer-readable storage medium is further provided, where the computer-readable storage medium stores a computer program, and when the computer program is executed in a computer, the computer is enabled to perform the method described with reference to FIG. 2, FIG. 4, FIG. 5, FIG. 8, or FIG. 10.

According to some embodiments in yet another aspect, a computing device is further provided, including a memory and a processor, where the memory stores executable code, and the processor executes the executable code to implement the method described with reference to FIG. 2, FIG. 4, FIG. 5, FIG. 8, or FIG. 10. A person skilled in the art should be aware that in the above-mentioned one or more examples, functions described in this application can be implemented by hardware, software, firmware, or any combination thereof. When these functions are implemented by software, they can be stored in a computer-readable medium or transmitted as one or more instructions or code on the computer-readable medium.

Some specific implementations described above further describe the purposes, technical solutions, and beneficial effects of this application. It should be understood that the above-mentioned descriptions are merely some specific implementations of this application and are not intended to limit the protection scope of this application. Any modification, equivalent replacement, or improvement made based on the technical solutions of this application shall fall within the protection scope of this application.

What is claimed is:

1. A computer-implemented method, performed by a first application serving as an initiator, comprising:
   acquiring target privacy data and protocol information related to a transmission handshake protocol;
   encrypting the target privacy data by using an encryption method that is determined based on the protocol information, to obtain ciphertext data;
   digitally signing the ciphertext data and the protocol information by using a private key of the first application, to obtain signature information;
   determining field content of an attestation field based on a running environment of the first application, wherein the attestation field is used to fill a remote attestation report, and the remote attestation report comprises public key information of the initiator; and
   encapsulating the field content of the attestation field, the protocol information, the ciphertext data, and the signature information into a data transmission unit based on a predetermined encapsulation format; and
   sending the data transmission unit to a receiver.

2. The computer-implemented method according to claim 1, further comprising:
   acquiring metadata determined for the target privacy data, wherein the metadata comprise at least one type of the following data: collection information description type data, data information flow direction type data, usage method restriction type data, security check type data, and compliance check type data; and
   the encrypting the target privacy data by using an encryption method that is determined based on the protocol information, to obtain ciphertext data comprises:

encrypting the target privacy data and the metadata by using the encryption method to obtain the ciphertext data.

3. The computer-implemented method according to claim 2, wherein the security check type data comprise one or more of a hash value of the target privacy data or data freshness of the target privacy data.

4. The computer-implemented method according to claim 1, wherein the determining field content of an attestation field based on a running environment of the first application comprises:
   when the running environment of the first application is a trusted execution environment (TEE), determining the field content to be a remote attestation report generated by the first application; or
   when the running environment of the first application is a non-TEE environment, determining the field content to be a predetermined field value indicating that there is no remote attestation report.

5. The computer-implemented method according to claim 1, wherein the public key information of the initiator is a public key corresponding to the private key; or the public key information of the initiator is a hash value of a public key corresponding to the private key, and the public key is further encapsulated in the data transmission unit.

6. The computer-implemented method according to claim 1, wherein the target privacy data comprise data used for privacy computation or a result of privacy computation.

7. A computer-implemented method, performed by a second application serving as a receiver, comprising:
   receiving a data transmission unit from an initiator;
   decapsulating the data transmission unit based on a predetermined encapsulation format, to obtain field content of an attestation field, protocol information related to a transmission handshake protocol, ciphertext data, and signature information for the protocol information and the ciphertext data;
   when the field content is a remote attestation report, verifying the remote attestation report;
   when the remote attestation report is successfully verified, verifying the signature information by using a public key corresponding to public key information of the initiator in the remote attestation report, wherein the remote attestation report is acquired by a first application serving as the initiator based on a trusted execution environment (TEE) in which the first application runs; and
   when the signature information is successfully verified, decrypting the ciphertext data by using a decryption method that is determined based on the protocol information, to obtain plaintext data, wherein the plaintext data comprise target privacy data.

8. The computer-implemented method according to claim 7, further comprising:
   when the field content indicates that there is no remote attestation report, verifying the signature information by using a pre-obtained valid public key of the initiator.

9. The computer-implemented method according to claim 7, wherein the public key information of the initiator comprises the public key.

10. The computer-implemented method according to claim 7, wherein the public key information of the initiator comprises a public key hash value, and data obtained through the decapsulating further comprise the public key; and the verifying the signature information by using a public key corresponding to public key information of the initiator in the remote attestation report comprises:

calculating a hash value of the public key; and verifying the signature information by using the public key when the hash value is consistent with the public key hash value.

11. The computer-implemented method according to claim 7, wherein the plaintext data further comprise metadata determined based on the target privacy data, and the metadata comprise one or more of security check type data or compliance check type data; and after the plaintext data are obtained, the computer-implemented method further comprises one or more of:

performing security check on the security check type data; or performing compliance check on the compliance check type data.

12. The computer-implemented method according to claim 11, wherein the security check type data comprise a privacy data hash value; and the performing security check on the security check type data comprises:

calculating a hash value of the target privacy data; and determining whether the hash value is consistent with the privacy data hash value.

13. The computer-implemented method according to claim 11, wherein the security check type data comprise data freshness of the target privacy data; and the performing security check on the security check type data comprises:

determining whether the data freshness reaches a predetermined freshness standard.

14. The computer-implemented method according to claim 11, wherein the target privacy data comprise user privacy data; and the performing compliance check on the compliance check type data comprises:

determining whether the compliance check type data comprise user authorization information corresponding to the user privacy data.

15. The computer-implemented method according to claim 11, wherein the metadata further comprise usage method restriction type data, and the usage method restriction type data indicate a computation method for performing privacy computation on the target privacy data; and the computer-implemented method further comprises:

when the security check and/or the compliance check succeeds, performing corresponding privacy computation on the target privacy data based on the computation method.

16. The computer-implemented method according to claim 7, wherein the plaintext data further comprise a computation method for performing privacy computation on the target privacy data; and the computer-implemented method further comprises:

performing corresponding privacy computation on the target privacy data based on the computation method.

17. The computer-implemented method according to claim 7, wherein the second application runs in a trusted execution environment (TEE), and the second application loads the data transmission unit into the TEE in which the second application runs, and then performs a subsequent step.

\* \* \* \* \*